United States Patent [19]

Wireman

[11] Patent Number: 4,737,776

[45] Date of Patent: Apr. 12, 1988

[54] CIRCUIT FOR DETECTING CUT TELEPHONE SERVICE LINE AND TRANSMITTING SIGNAL OVER TELEPHONE TRUNK LINE

[76] Inventor: Wallace Wireman, 13 Park Ave., Walton, Ky. 41094

[21] Appl. No.: 894,357

[22] Filed: Aug. 7, 1986

[51] Int. Cl.$^4$ .............................................. G08B 21/00
[52] U.S. Cl. .................... 340/652; 340/540; 361/119
[58] Field of Search ............... 340/652, 508, 506, 540, 340/541; 361/119

[56] References Cited

U.S. PATENT DOCUMENTS

| | | | |
|---|---|---|---|
| 2,691,698 | 10/1954 | Schmidt | 340/652 X |
| 4,012,728 | 3/1977 | Fowler | 340/508 |
| 4,228,424 | 10/1980 | Le Nay et al. | 340/506 |
| 4,310,835 | 1/1982 | Sefton | 340/508 X |

Primary Examiner—James L. Rowland
Assistant Examiner—Jeffery A. Hofsass
Attorney, Agent, or Firm—Frost & Jacobs

[57] ABSTRACT

The present invention is a circuit for activating a local alarm when a telephone service line is cut. A closed loop circuit is formed by a pair of insulated monitor wires electrically connected at their first ends to a resistor and electrically connected at their second ends to a normally closed circuit of an alarm. The wires are secured to a telephone service line. Shrink tubing encapsulates the wires and the service line together in a single cable. When the cable is cut, thereby severing either or both of the insulated monitor wires as well, the closed loop circuit is opened, thereby activating the alarm. In various embodiments of the invention, circuitry is provided upstream from the cable for signaling a telephone company of a loss of a service line connection. A load or signal is generated by the circuitry and transmitted over telephone service lines. When such a load is detected, proper authorities can be notified of the loss of the service line connection.

7 Claims, 3 Drawing Sheets

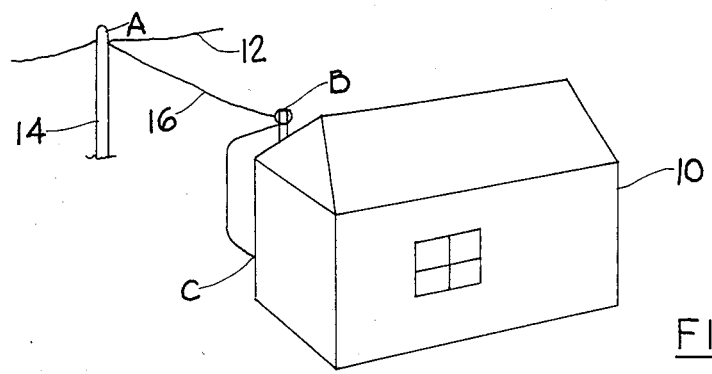
FIG. 1
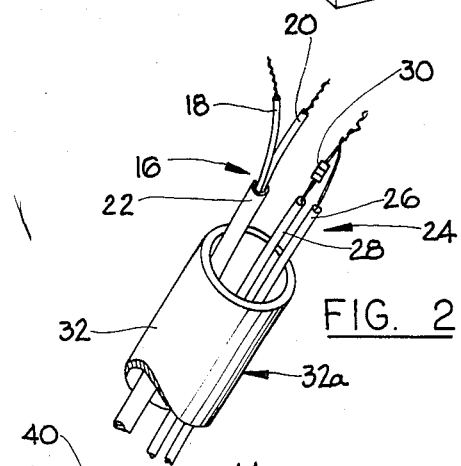
FIG. 2
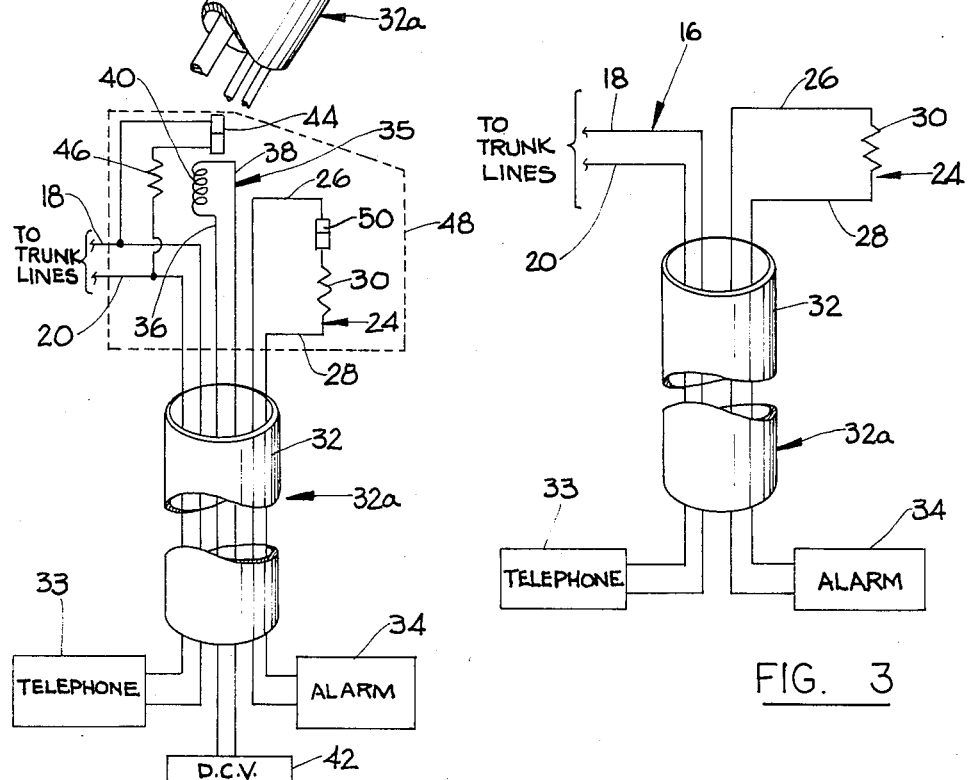
FIG. 3
FIG. 4

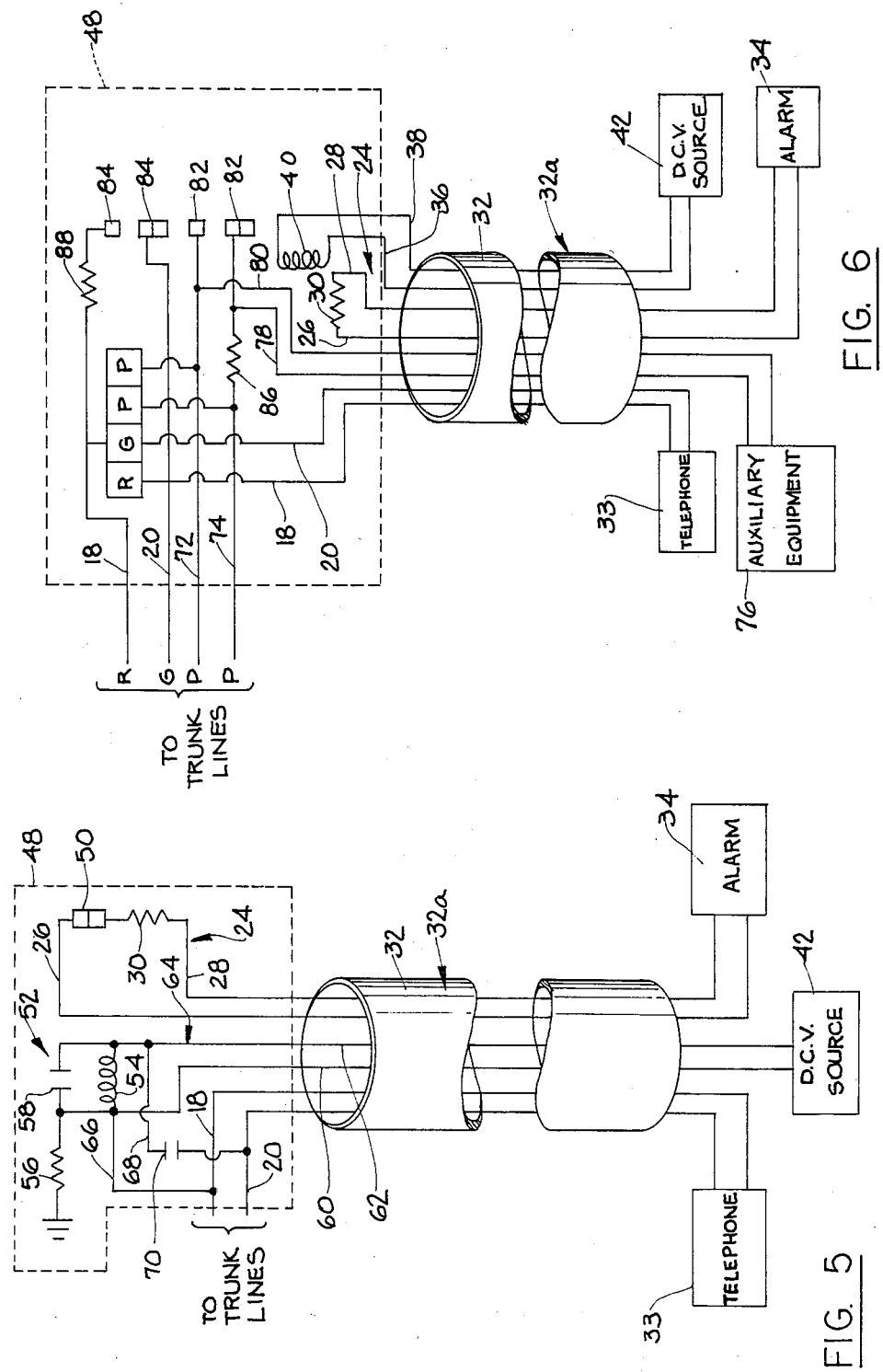

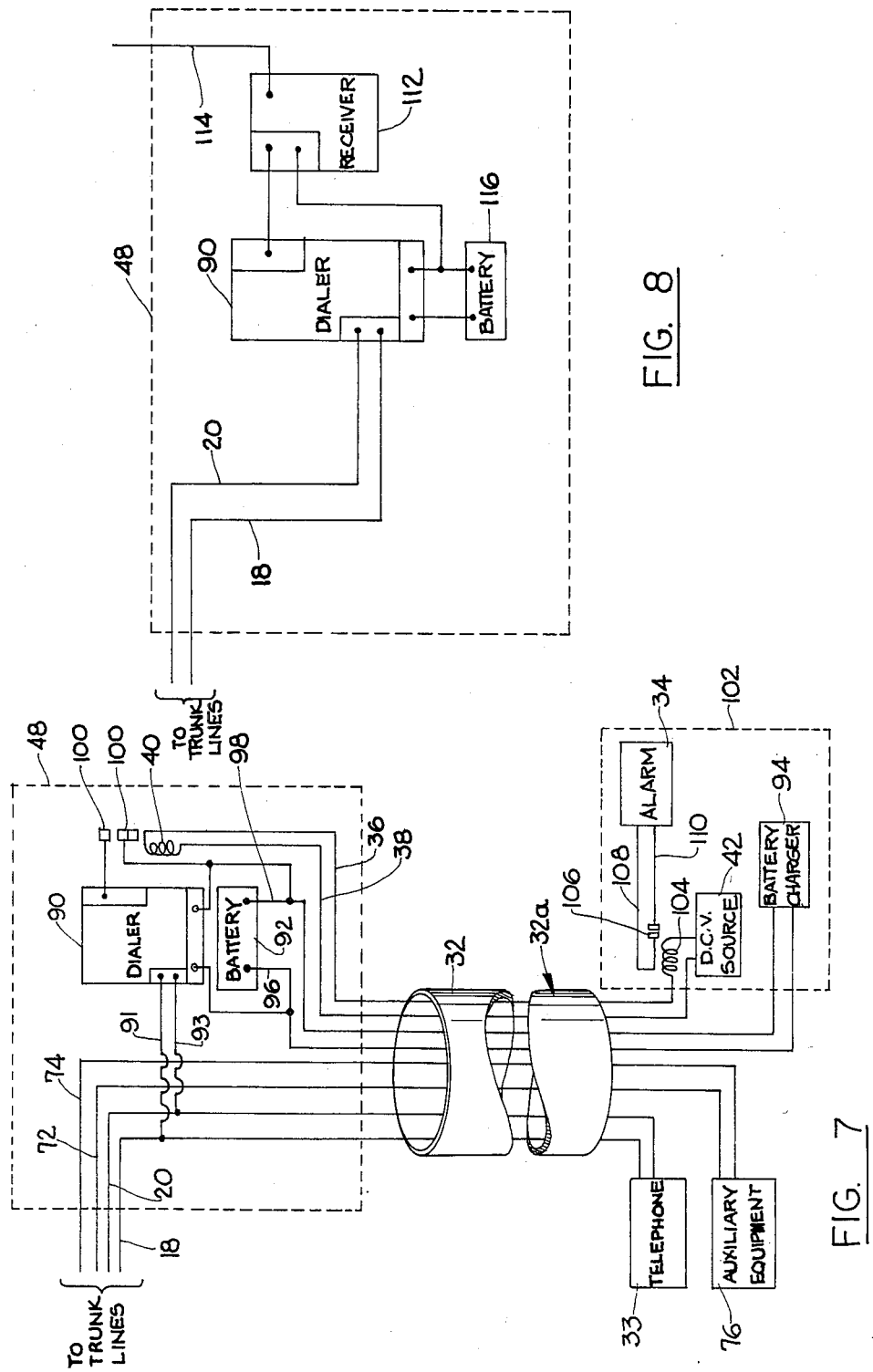

CIRCUIT FOR DETECTING CUT TELEPHONE SERVICE LINE AND TRANSMITTING SIGNAL OVER TELEPHONE TRUNK LINE

BACKGROUND OF THE INVENTION

1. Field of the Invention

The present invention relates generally to a security system for detecting a cut telephone line, and more particularly is concerned with a circuit for activating an alarm when a telephone service line is cut and transmitting a signal over a telephone trunk line.

2. Description of the Prior Art

Many security systems have been developed for detecting an unauthorized entrance. A common system utilizes sensors to detect vibrations at entry points, smoke, etc. When activated, the sensors send a signal to a central processing unit which in turn activates an alarm, switches on floodlights, etc. Oftentimes, the central processing unit includes a dialer which sends a taped message over telephone lines to authorities such as police, fire, medical services, etc.

Such systems are vulnerable to cut telephone lines. Once a telephone line is cut, the system can no longer dial a selected number. Intruders can proceed with the knowledge that the detection system can not dial for assistance.

Many telephone monitoring systems require continuous monitoring of a line. Other systems can not send a signal or call once a line is cut, or require a second line to send a call. For example, a telephone monitoring system, Versus 90, is sold by Base Ten Systems, Inc. of One Electronics Drive, Trenton, N.J. 08619. The device uses existing telephone connections and can be tied to a variety of detection sensors. When activated, a signal is sent over telephone lines to a monitoring agency. The agency in turn receives the signal and notifies the proper authorities. The system sends a continuous inaudible electronic signal every half second. If the telephone line is cut, the interruption can be detected immediately. U.S. Pat. No. 4,529,971 issued to James in 1985 and assigned to Base Ten Systems, Inc. discloses an apparatus for indicating a break in lines leading from a base station to a monitored instrumentality.

An AC Power/Telephone Line Monitor is sold by ADEMCO, 165 Eileen Way, Syosset, N.Y. 11791. The device monitors the incoming telephone line to a digital communicator or tape dialer and the AC input to a control panel. If a telephone line fault occurs, a local alarm will be activated and a communicator will call out on a second telephone line.

U.S. Pat. No. 3,852,541 issued to Altenberger in 1974 discloses a burglar alarm actuated by cutting of a telephone wire. An alarm relay switch-actuating circuit is connected to telephone wire contacts. A full-wave bridge rectifier prevents erroneous matching of polarity to the circuit. When a telephone line is cut, a relay switch closes to actuate an alarm. However, the circuit does not provide a system for alerting a phone company that a line has been cut.

U.S. Pat. No. 4,258,357 issued to Browell in 1981 discloses an alarm signaling system which is monitored by a telephone company. When the signaling condition is removed from a telephone line by, for example, a burglar detection system, equipment at the telephone company activates an alarm. Whenever the telephone line is cut, the alarm is tripped.

U.S. Pat. No. 3,919,705 issued to Stendig et al. in 1975 discloses a loop cord alarm system for preventing unauthorized removal of plugs for electrical appliances. When a plug is removed, a relay is deenergized, actuating contacts to generate an alarm.

Consequently, a need exists for improvements in telephone monitoring systems. A system should activate an alarm once a line is cut without continuous monitoring of the telephone line. It is desirable that a system send a signal over the telephone to notify the telephone company that a service line has been cut.

SUMMARY OF THE INVENTION

The present invention provides a circuit for activating a local alarm when a telephone service line is cut. The circuit is inactive until a service line is cut and does not require constant monitoring. The circuit is not electrically connected to and does not interfere with telephone service. The alarm activation circuit is inexpensive and easy to install in existing and new telephone service lines.

The present invention is a circuit for activating a local alarm when a telephone service line is cut. A closed loop circuit is formed by a pair of insulated monitor wires electrically connected at their first ends to a resistor and electrically connected at their second ends to a normally closed circuit of an alarm. The wires are secured to a telephone service line. Shrink tubing encapsulates the wires and the service line together in a single cable. When the cable is cut, thereby severing either or both of the insulated monitor wires as well, the closed loop circuit is opened, thereby activating the alarm.

In various embodiments of the invention, circuitry is provided upstream from the cable for signaling a telephone company of a loss of a service line connection. A load or signal is generated by the circuitry and transmitted over telephone trunk lines. When such a load is detected, proper authorities can be notified of the loss of the service line connection.

BRIEF DESCRIPTION OF THE DRAWINGS

FIG. 1 illustrates a typical telephone service line connection to a building.

FIG. 2 is a pictorial sketch of an embodiment of the present closed loop circuit for detecting a cut telephone line.

FIG. 3 is a schematic circuit diagram showing the embodiment of the present invention partially illustrated in FIG, 2.

FIG. 4 is a circuit diagram of a second preferred embodiment of the present invention having a pair of normally closed contacts for generating a load over telephone service lines.

FIG. 5 is a circuit diagram of a third preferred embodiment of the present invention having a tank circuit for generating a signal to a telephone company.

FIG. 6 is a circuit diagram of a fourth preferred embodiment of the present invention showing a telephone service line having four wires.

FIG. 7 is a circuit diagram if a fifth preferred embodiment of the present invention having a dialer to generate a signal over telephone service lines.

FIG. 8 is a circuit diagram of a sixth preferred embodiment of the present invention.

DETAILED DESCRIPTION OF THE PREFERRED EMBODIMENTS

A typical telephone connection for a residence or business building 10 is illustrated in FIG. 1. A telephone trunk line 12 is supported by a telephone pole 14 in a conventional manner. The trunk line 12 provides telephone service between a utility's facilities and an end user. A service line 16 branches from the trunk line 12 at point A. The service line 16 is strung to a building 10 and supported at its highest point at point B. From point B the service line 16 is routed down and enters the building 10 at point C.

Typically, a burglar detection system (not shown) monitors the building 10 and is actuated by remote sensors. When actuated, the system calls a predetermined number (a security company, the police, etc.) and actuates a local alarm. However, such a system is rendered ineffective and can not place calls when the service line 16 is cut. It is the length of service line 16 between points B and C that is most vulnerable to cutting and tampering by burglars and others.

A conventional telephone service line 16 includes a pair of wires 18 and 20, as illustrated in the pictorial sketch of FIG. 2, although some systems may use more than two wires. Conventionally, in a two wire system, wires 18 and 20 are wrapped in red and green insulation, respectively. Both wires 18 and 20 are then wrapped in an insulating tubing 22 and are fed from drop point B into the building 10 at point C. Once inside the building 10, the service line 16 is routed through interior partitions and terminates in plugs or connectors which service individual telephones.

The present invention contemplates a system and circuit for activating an alarm of a burglar detection system when the telephone service line 16 is cut. Throughout the embodiments and Figures, like reference numerals are used to indicate like elements. As illustrated in FIG. 2, a closed loop circuit, part of which is generally shown at 24, is formed by a pair of insulated monitor wires 26 and 28 having a current limiting resistor 30 electrically connected between them. Alternately, if desired, the loop circuit 24 can be formed from a two conductor wire. The bare ends of wires 26 and 28 are soldered and encapsulated with an insulating plastic sleeve (not shown) to prevent an inadvertent short circuit. Wires 26 and 28 may be taped or otherwise secured to the exterior of tubing 22 of service line 16. Shrink tubing 32 may then be used to wrap and form a sheath around wires 26 and 28 and tubing 22, thereby forming a unitary cable shown generally at 32A. Using heat, the shrink tubing 32 is shrunk tightly around both the tubing 22 and wires 26 and 28, resulting in the appearance of a single wire coming into the building 10. Thus, the presence of monitor wires 26 and 28 cannot be visually detected. It is preferred that the closed loop circuit 24 and the shrink tubing 32 extend at least from point C to point B. For additional protection, the closed loop 24 and shrink tubing 32 can be routed farther back up the line, for example, back to the telephone pole 14 at point A.

FIG. 3 is a schematic view of the complete alarm-/telephone system, including the portion of the loop circuit 24 shown in the pictorial sketch of FIG. 2. The service line 16 with wires 18 and 20 is connected to a telephone 33 by plugs or connectors (not shown) in a well known manner. The closed loop circuit 24 is connected to a normally closed or supervisory circuit of the alarm 34 of the burglar detection system. The alarm 34 can include both audio and visual responses, for example a siren and floodlights. If desired, the alarm 34 can be independent from the burglar detection system. When the closed loop 24 is opened by cutting either or both of monitor wires 26 and 28, or is shorted by bridging monitor wires 26 and 28 with a conductor, e.g. a knife, the alarm 34 is caused to trip as will be described hereinafter.

Typically, a burglar detection system includes an alarm such as a siren, ringer, floodlights, etc. The alarm is monitored by a dormant supervisory circuit. When the supervisory circuit is opened by remote sensors, etc., the alarm is activated. The present closed loop 24 is electrically connected to the supervisory circuit. When the closed loop 24 is opened, the supervisory circuit is opened thereby activating the alarm.

The embodiment of the present invention as illustrated in FIGS. 2 and 3 is described in a manner suitable for retrofitting existing telephone service connections with a closed loop circuit 24. For inconspicuous installation, it is necessary to disconnect the service line 16 to provide a free end for sliding the shrink tubing 32 over tubing 22 and wires 26 and 28. For new installations, it is desirable to install the closed loop circuit 24 within the service line tubing 22.

In many instances, it is desirable to signal or call a security company, the police, etc. when a service line 16 has been cut. A second preferred embodiment of the present invention, illustrated in FIG. 4, includes a system for notifying a telephone company when a service line 16 has been cut. Telephone wires 18 and 20 are connected to the telephone 33 as described above. Shrink tubing 32 encapsulates four wires 26, 28, 36, and 38 with the telephone wires 18 and 20 to form the cable 32A. Wires 26 and 28 form a closed loop 24 and are connected to the alarm 34 as previously described. A second closed loop, illustrated generally at 35, is included in the cable 32A. Wires 36 and 38 are electrically connected to the coil of relay 40 at approximately the farthest point of the cable 32A, for example point B. The second loop is connected to a DC voltage source 42 which can be independent of the burglar detection system. Normally closed contacts 44 associated with relay 40 are connected to telephone wires 18 and 20, respectively, with a resistance 46 being placed in series with the connector from wire 20. Since the second loop 35 is normally closed, the relay 40 is energized and holds contacts 44 open.

However, when cable 32A is cut, thereby severing either or both of wires 36 or 38 and either or both of wires 26 and 28, telephone service stops and the first loop 24 is opened, activating alarm 34. Also, current ceases to be supplied to the relay 40, resulting in the closing of the contacts 44. The closed contacts 44 cause a load to form through a resistor 46 which can be detected by the telephone company in a known manner. Detection of the load indicates that a service line has been cut. The size of the resistor 46 is determined by the sensing equipment of the telephone company. For most conventional applications, a 2 K ohm resistor is sufficient.

It may also be desirable to mount the electrical and electronic components of the present invention in a housing 48. The housing 48 should be mounted in a location not readily accessible to potential burglars. Also, it is desirable that the housing 48 conform to NEMA standards. A tamper-proof switch activated by a spring-biased cover (not shown) may also be mounted to normally closed switch contacts 50. The contacts 50 are electrically connected serially as part of the closed loop circuit 24. Any undesired attempt to remove the cover opens the contacts 50, thereby opening loop 24 and activating alarm 34.

In a third preferred embodiment of the present invention, illustrated in FIG. 5, a system for notifying a telephone company of a cut service line 16 is provided by current stored in a tank circuit indicated generally at 52. Tank circuit 52 includes an oscillator coil 54, a resistor 56 and a capacitor 58. The tank circuit 52 is electrically connected to a DC voltage source 42 by monitor wires 60 and 62 to form a second closed loop designated generally at 64. Wires 60 and 62 are included within the shrink tubing 32 to form part of cable 32A. While connected to the DC voltage source 42, the tank circuit 52 oscillates with the call tone of a telephone. The oscillator resistor 52 is electrically connected to the telephone wires 18 and 20 which provide service to a telephone 33. As described above in FIG. 4, a first closed loop 24 is also electrically connected to an alarm 34.

When cable 32A is cut, thereby severing either or both of monitor wires 60, 62 and either or both of monitor wires 26, 28 and either or both of service wires 18, 20, telephone service also ceases. The alarm 34 is activated when the first closed loop 24 is opened. At the same time, voltage ceases to be supplied to the tank circuit 52. The removal of the voltage supply from tank circuit 52 causes the tone transmitted to telephone wires 18 and 20 through wires 66 and 68 and capacitor 70 to stop. Equipment at the telephone company can detect the absence of the tone generated by the tank circuit 52 and notify selected authorities of the loss of a service line 16 connection.

In certain telephone installations, four wires are contained in the service line 16 rather than the two wires 18 and 20 described above. The additional wires, generally known as power lines and indicated at 72 and 74 in FIGS. 6–8, are used for special equipment and are not utilized for regular telephone service.

A fourth embodiment of the present invention illustrated in FIG. 6 includes a system for signaling the telephone company of a loss of service line 16 connection in an installation having four service wires 18, 20, 72 and 74. Power lines 72 and 74 are electrically connected to and utilized with auxiliary equipment 76 by wires 78 and 80 included as part of cable 32A. Inside housing 48, power lines 72 and 74 are electrically connected to a pair of normally closed contacts 82. As described in the embodiments above, a first closed loop 24 is electrically connected to an alarm 34. The coil of relay 40 is electrically connected to DC voltage source 42 in a second closed loop 35 by means of wires 36 and 38. Wires 18 and 20 provide service to a telephone 33 and are electrically connected to a pair of normally closed contacts 84 inside the housing 48. Contacts 82 and 84 are held open when relay 40 is energized.

When cable 32A of FIG. 6 is cut, thereby severing either or both of the wires contained in wire pairs 18/20, 26/28, 36/38, and 78/80, the alarm 34 is activated, service to the telephone 33 and auxiliary equipment 76 is interrupted, and relay 40 is de-energized. As relay 40 is de-energized, contacts 82 and 84 close. When contacts 82 close, a path is formed through resistor 86 that can be detected by the telephone company through power lines 72 and 74. When contacts 84 close, a path is formed through resistor 88 that can be detected by the telephone company through wires 18 and 20.

A fifth embodiment of the present invention is illustrated in FIG. 7. An automatic telephone dialer 90, preferably digital, is mounted in the housing 48 and powered by a rechargeable battery 92. A battery charger 94 is electrically connected to the battery by wires 96 and 98 included as part of cable 32A. A pair of normally closed contacts 100 mounted inside the housing 48 are energized by relay 40. The coil of relay 40 is electrically connected to a DC voltage source by wires 36 and 38 included as part of cable 32A. The contacts 100 are electrically connected to telephone wires 18 and 20 by wires 91 and 93. If desired, the dialer can be electrically connected to power lines 72 and 74 in lieu of lines 18 and 20. Furthermore, the embodiment illustrated can be operated without power lines 72 and 74 and auxiliary equipment 76 if desired.

A housing 102, representative of a housing of a burglar detection system, is illustrated in FIG. 7 and located where it cannot be tampered with. A relay 104 is mounted in the housing 102 and the coil of relay 104 is electrically connected to the DC voltage source 42. A pair of normally closed contacts 106 are electrically connected to an alarm 34 by wires 108 and 110. The contacts 106 are held open when relay 104 is energized to create an open circuit to the alarm 34.

When the cable 32A of FIG. 7 is cut, thereby severing either or both of the wires in wire pairs 18/20, 36/38, 72/74, and 96/98, relay 104 de-energizes, causing contacts 106 to close, thereby activating alarm 34. Furthermore, as relay 40 de-energizes, contacts 100 close, causing a signal to be transmitted to the dialer 90. The dialer 90 generates a predetermined signal through wires 91 and 93, which is in turn transmitted to telephone wires 18 and 20. The signal can be detected by appropriate equipment at the telephone company.

FIG. 8 illustrates a sixth embodiment of the present invention particularly useful at construction sites and other remote temporary locations. A radio receiver 112 having an antenna 114 is mounted inside the housing 48. The receiver 112 is electrically connected to an automatic telephone dialer 90. A radio transmitter (not shown) is triggered by an unauthorized entry sensor, for example, and produces a transmitted signal. Also the transmitter could form part of any burglar detection system, including the embodiments of the present invention illustrated in FIGS. 2–7. When the receiver 112 receives the transmitted signal from the transmitter, a pulse is furnished to trigger the dialer 90, causing a signal to be transmitted to telephone wires 18 and 20.

When the alarm 34 is activated by cutting cable 32A, the transmitter sends a signal to the receiver 112. The transmitter can be programmed to send predetermined signals for fire, medical assistance, etc. The embodiment of FIG. 8 can be located in a remote location of a building to prevent tampering. If long periods of use are desired, battery 116 must be replaced or additional batteries can be provided.

Although the present invention has been described with reference to preferred embodiments, workers skilled in the art will recognize that changes may be made in form and detail without departing from the spirit and scope of the invention.

What is claimed is:

1. A method for detecting a cut telephone service line, activating an external alarm and transmitting a signal over a telephone trunk line, comprising:

(a) placing at least a portion of a first closed loop circuit closely adjacent a portion of a telephone service line vulnerable to cutting;

(b) electrically connecting the first closed loop circuit to an external alarm;

(c) placing at least a portion of a second closed loop circuit closely adjacent a portion of a telephone service line vulnerable to cutting;

(d) electrically connecting the second closed loop circuit to a signal means; and (e) installing a covering over the closed loop circuits and the portion of the telephone service line that the closed loop circuits are adjacent such that closed loop circuits are hidden from view to form a cable;

whereby cutting the cable opens the first closed loop circuit to activate the external alarm and opens the second closed loop circuit so that the signal means transmits a signal over the telephone trunk line.

2. A circuit for use with an alarm for detecting a cut telephone service line and transmitting a signal over a telephone trunk line comprising:

(a) a first closed loop circuit installed closely adjacent a desired length of a telephone service line;

(b) a second closed loop circuit installed closely adjacent a desired length of the telephone service line;

(c) a tubing covering the first and second closed loop circuits and the desired length of telephone service line to form a unitary cable;

(d) alarm means having a supervisory circuit electrically connected to the closed loop circuit; and (e) signal means for transmitting a signal over the telephone line electrically connected to the second closed loop circuit;

whereby the first and second closed loop circuits are opened when the tubing is cut, thereby opening the supervisory circuit and activating the alarm means, and activating the signal means.

3. The circuit as specified in claim 2 wherein the signal means comprise:

a relay electrically connected to a voltage source by the second closed loop circuit, the relay energizing and opening associated normally closed contacts when current from the voltage source is supplied, whereby cutting the tubing and the second closed loop circuit ceases the supply voltage to the relay, causing the contacts to close and create a load through a resistor which is detected over the telephone trunk line.

4. The circuit as specified in claim 2 wherein the signal means comprises:

oscillator means electrically connected to a voltage source by the second closed loop circuit, the oscillator means generating a tone transmitted over the telephone tunk line, whereby cutting the tubing and the second closed loop circuit ceases the supply voltage to the oscillator means, thereby ceasing generation of the tone.

5. The circuit as specified in claim 2 wherein the signal means comprises:

(a) a relay electrically connected to a voltage source by the second closed loop circuit;

(b) an electronic dialer electrically connected to the telephone trunk line; and (c) normally-closed contacts electrically connected to the dialer and opened by the energized relay;

whereby cutting the tubing and the second closed loop circuit ceases the supply voltage to the relay, causing the contacts to close and trigger the dialer to dial a predetermined number over the telephone trunk line.

6. The circuit as specified in claim 2 wherein the signal means comprises:

(a) an electronic dialer electrically connected to the telephone trunk line; and (b) receiver means for receiving a radio signal from a transmitter indicating that the tubing has been cut;

whereby the dialer is triggered by the receiver means and dials a predetermined number over the telephone trunk line.

7. The circuit as specified in claim 2 wherein the signal means is enclosed in a housing means having a tamper-proof switch electrically connected to the first closed loop circuit whereby an undesired attempt to open the switch opens the first closed loop cicuit and activates the alarm.

* * * * *